# 2,986,523

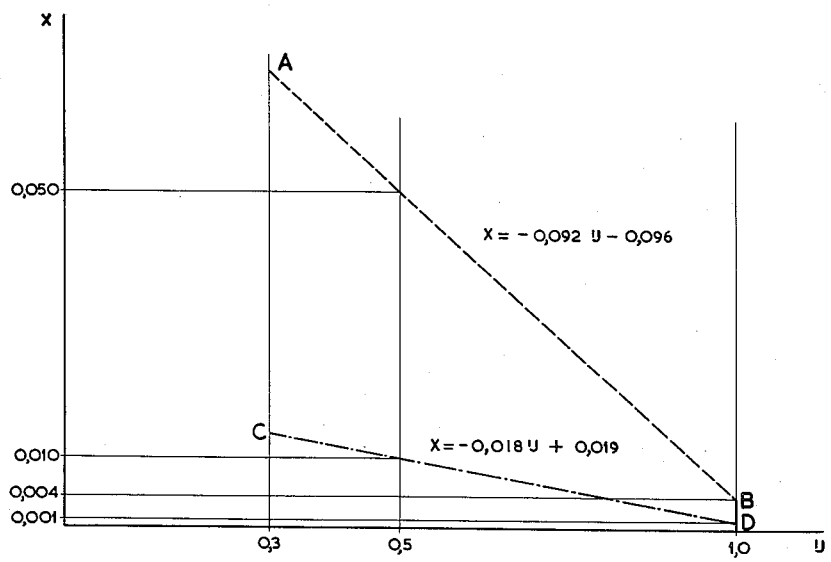
INVENTORS
CORNELIS MARTINUS VAN DER BURGT
JOHAN FREDERIK GUGELOT

MODIFIED LITHIUM FERRITE

Cornelis Martinus van der Burgt, Eindhoven, Netherlands, and Johan Frederik Gugelot, near Windsor, New South Wales, Australia, assignors to North American Philips Company, Inc., New York, N.Y., a corporation of Delaware Filed May 2, 1957, Ser. No. 656,529

1 Claim. (Cl. 252—62.5)

Our invention relates to ferromagnetic material and method of making the same.

In particular our invention relates to a class of materials known as ferrites. These materials are characterized by a spinel structure, i.e. their crystal structure is isomorphous with the spinel $MgAl_2O_4$ and are further characterized by a composition corresponding to the formula $MFe_2O_4$ in which M represents one or more bivalent metals such as copper, magnesium, zinc, nickel, cadmium, manganese and the like. In certain specific compositions M may be a metal other than a bivalent such as lithium as described in U.S. Patent 2,751,353 to E. W. Gorter.

As described in that patent, a portion of ferric ions occupy lattice sites in the crystal normally occupied by the bivalent ions and the composition of the material may be considered as $$Li_{0.5}Fe^{3+}_{0.5}Fe_2O_4$$

the valence requirements of the general formula therefore being satisfied by a combination of lithium and ferric ions.

Furthermore, this patent discloses that the addition of zinc into the aforesaid composition markedly increases the initial permeability thereof; that is, if the composition is written as $$(Li_{0.5}Fe^{3+}_{0.5})_yZn_{1-y}Fe_2O_4 \quad (1)$$

and $y$ has a value less than 1 the value of $\mu_0$ is increased. However, it has been found that the value of $\mu_0$ for this material is strongly temperature dependent.

It is a principal object of our invention to provide a ferromagnetic material which has a large initial permeability which is not temperature dependent.

A further object of our invention is to improve the materials described in the aforesaid patent by making their initial permeability substantially independent of temperature.

These and further objects of our invention will appear as the specification progresses.

In accordance with our invention we have unexpectedly found that the addition of a small amount of cobalt in the compositions described in the aforesaid patent increases their temperature stability, that is, the temperature dependence of the initial permeability is reduced substantially. The cobalt may replace either a portion of the zinc or a part of the lithium-ferric iron portion of the composition.

The materials according to the invention have a composition corresponding to the formula:

$$Co_x[(Li_{0.5}Fe^{3+}_{0.5})_yZn_{1-y}]_{1-x}Fe_2O_4 \quad (2)$$

in which the value of $y$ is greater than 0.3 and equal or less than 1.0. For a value of $y=0.5$, $x$ has a value between 0.010 and 0.059. For a value of $y=1.0$, $x$ has a value between 0.001 and 0.004. Values of $x$ for values of $y$ intermediate 0.3 and 0.5 and between 0.5 and 1.0 can easily be determined by extrapolation or interpolation of the straight lines connecting the aforesaid points of $y$.

Small variations within the limits of the above-formula are permissible particularly in view of the fact that not all of the initial constituents, generally oxides or compounds which furnish oxides upon heating, such as carbonates, nitrates, acetates, and formates, react to form the ferrite since the reaction involves solid constituents in a finely-divided state. Moreover, due to the volatility of lithium oxide and the possible formation of bivalent iron at higher temperatures, slight variations in the composition, as expressed in the above-noted formula, are to be expected. However, the formation of bivalent iron—in the form of magnetite, $Fe_3O_4$—should be avoided or minimized in order to reduce the loss factor of the material.

The addition of the cobalt markedly decreases the temperature coefficient of initial permeability of the material in the temperature range of 20° to 50° C. making this material eminently suitable for cores in magnetostrictive vibrators in which the mechanical resonance frequency should be stable with temperature.

It is essential to the invention that the material both from a macroscopic and a microscopic point of view, be as homogeneous as possible. That is, even under a microscope the material should consist essentially of a single phase. In the manufacture of these materials it is therefore essential to use materials of considerable purity and to grind these materials to a fine particle size, e.g., one micron. Heating at high temperature, e.g. 900° to 1200° C., is essential to insure a complete reaction. Since lithium is apt to volatilize rather readily at those temperatures in the form of the volatile compound $Li_2O_2$, it may be necessary to incorporate an excess of the lithium compound in the initial reaction mixture. However, it is preferable to prepare the compound $LiFeO_2$ first by mixing equivalent amounts of a lithium compound which decomposes upon heating to form lithium oxide, for example, lithium carbonate or lithium nitrate, and ferric oxide ($\alpha$-$Fe_2O_3$) and heating this mixture at about 700° C. Alternatively, the lithium compound can be mixed, in proper portions with $\gamma$-$Fe_2O_3$ and heated at 400° to 500° C. to form $LiFeO_2$.

The $LiFeO_2$ is thereafter mixed, in finely-divided form, with ferric oxide, cobalt oxide and zinc oxide, if desired, in the proper proportions for obtaining a composition within the range of the aforesaid formula. Preferably a slight excess of the $LiFeO_2$ is employed to compensate for any loss of lithium by volatilization and to reduce the proportion of $Fe_2O_3$ to avoid the formation of $Fe_3O_4$. Heating is preferably effected at 1125° C. in air for about three hours. The cooling rate is not critical but slow cooling is preferred, e.g. within about five hours.

The following example is illustrative of the invention.

The compound $LiFeO_2$ was prepared by firing approximately equal parts of lithium carbonate and $Fe_2O_3$ for two hours at 700° C. in air. A mixture of 141 g. of this substance with 2 g. of cobalt carbonate, $CoCO_3$ (45% by weight of cobalt) and 461 g. of iron oxide (98.8% by weight $Fe_2O_3$) was ground in a ball-mill, in the presence of alcohol, and prefired in air for two hours at 800° C. The prefired product was ball-milled for 18 hours, again in the presence of alcohol, the alcohol removed, and the ground product dried, pressed into rings, fired for two hours at 1100° C. in air and cooled to room temperature in above five hours. The composition of the product thus obtained may be represented by the formula:

$$Co_{0.005}(Li_{0.5}Fe^{3+}_{0.5})_{0.995}Fe_2O_4$$

Nearly 4% of the lithium atoms present in the initial material was lost, due to evaporation.

Similarly, the other preparations listed in the following table may be prepared by varying the proportions of $LiFeO_2$, cobalt carbonate, ferric oxide, and zinc oxide, if desired, in the initial mixture.

| $x$ | $y$ | $(\mu_0)_{min}$ | $(\mu_0)_{max}$ | $(\mu_0)_{av}=\frac{(\mu_0)_{max}+(\mu_0)_{min}}{2}$ | Temperature factor $F\times 10^6$ | $\tan\delta_{(\%)}\times 10^2$ | $\left(\frac{\tan\delta}{\mu_0}\right)\times 10^6$ | Method of sintering |
|---|---|---|---|---|---|---|---|---|
| 0.000 | 1.0 | 24.5 | 24.0 | 24.25 | 28 | 0.48 | 200 | 2 hours in air at 1,040° C.; 5 mol. percent of $Fe_2O_3$ weighed short in relation to Formula 2. |
| 0.001 | 1.0 | 25.3 | 24.9 | 25.10 | 21 | 0.445 | 179 | |
| 0.002 | 1.0 | 24.3 | 24.2 | 24.25 | 6 | 0.43 | 178 | |
| 0.003 | 1.0 | 25.2 | 25.2 | 25.2 | 0 | 0.425 | 169 | |
| 0.004 | 1.0 | 26.8 | 26.4 | 26.6 | 19 | 0.400 | 145 | |
| 0.005 | 1.0 | 27.7 | 27.1 | 27.40 | 27 | 0.39 | 141 | |
| 0.010 | 1.0 | 33.3 | 29.7 | 31.50 | 121 | 0.375 | 113 | |
| 0.015 | 1.0 | 42.3 | 35.8 | 39.05 | 142 | 0.455 | 127 | |
| 0.020 | 1.0 | 32.7 | 22.8 | 27.25 | 444 | 0.58 | 255 | |
| 0.050 | 1.0 | 9.4 | 7.5 | 8.45 | 890 | 0.70 | 745 | |
| 0.000 | 0.5 | 272 | 242 | 257 | 15 | 1.01 | 41 | 3 hours in air at 1,120° C.; 5 mol. percent of $Fe_2O_3$ weighed short in relation to Formula 2. |
| 0.020 | 0.5 | 244 | 240 | 242 | 2.4 | 1.26 | 53 | |
| 0.040 | 0.5 | 234 | 224 | 229 | 6.3 | 0.84 | 41 | |
| 0.060 | 0.5 | 324 | 246 | 285 | 32 | 0.56 | 22 | |
| 0.080 | 0.5 | 272 | 166 | 219 | 74 | 0.76 | 46 | |
| 0.000 | 0.5 | 226 | 202 | 214 | 17.5 | 1.6 | 80 | 3 hours in air at 1,125° C.; weighed amount of $Fe_2O_3$ in conformity with Formula 2. |
| 0.010 | 0.5 | 200 | 186 | 193 | 12.5 | 1.3 | 70 | |
| 0.015 | 0.5 | 183 | 179 | 181 | 4.1 | 1.2 | 65 | |
| 0.020 | 0.5 | 185 | 183 | 184 | 2.0 | 1.1 | 60 | |
| 0.030 | 0.5 | 206 | 200 | 203 | 4.9 | 0.95 | 50 | |
| 0.040 | 0.5 | 226 | 219 | 222.5 | 4.7 | 0.95 | 45 | |
| 0.060 | 0.5 | 213 | 194 | 203.5 | 15.3 | 0.85 | 45 | |
| 0.080 | 0.5 | 162 | 94 | 128 | 138 | 0.85 | 90 | |

The table illustrates the influence of a small amount of cobalt as above-mentioned upon the so-called "temperature-factor" (F), that is to say the temperature coefficient (Tc) of the initial permeability ($\mu_0$) divided by this initial permeability. From a techanical point of view, this temperature factor is a more important magnitude than the temperature coefficient itself, since it is not influenced by the presence of air-gaps in the magnetic circuit. Since it is possible that in a certain temperature range the initial permeability varies as a function of temperature in capricious manner, that is to say exhibits one or more maxima and/or minima, it is desirable for the temperature factor to be defined by means of the following formula:

$$F=\frac{Tc}{(\mu_0)_{av}}=\frac{(\mu_0)_{max}-(\mu_0)_{min}}{(\mu_0)^2_{av}\times(t_2-t_1)} \quad (3)$$

In this formula $(\mu_0)_{max}$ and $(\mu_0)_{min}$ indicate the maximum and minimum values, respectively, of the initial permeability which occurs in the region between the temperatures $t_2$ and $t_1$, while $(\mu_0)_{av}$ indicates the average value of the initial permeability in this region.

The values of $x$ and $y$ as specified in the table relate to the composition of the materials according to the aforementioned Formula 2. The $\mu_0$-values have been measured in the temperature range of from 20° C. to 50° C. The tan δ values were measured at 20° C. and (a) At a frequency of about 450 kc./s. for $y=1$;
(b) At a frequency of about 200 kc./s. for $y=0.5$ and with a "deficiency" of $Fe_2O_3$ in the initial material in relation to compositions according to the Formula 2;
(c) At a frequency of about 250 kc./s. for $y=0.5$ and with an amount of $Fe_2O_3$ in the initial material, corresponding to Formula 2.

In order to illustrate the invention, reference is made to the accompanying drawing in which the sole figure is a graph which shows the relationship of the constituents of the composition.

Along line A.B of the graph are plotted maximum values of $x$ corresponding to values of $y$ in the aforesaid formula. This line represents an equation $$x=-0.092y+0.096$$

At $y=1$, $x=0.004$; at $y=0.5$, $x=0.050$. For values of $y$ intermediate 0.3 and 1.0, corresponding maximum values of $x$ can be found on the line A.B.

Similarly, the line C—D is a plot of minimum values of $x$ as defined by the equation: $x=-0.018y+0.019$.

Thus, for any given value of $y$, $x$ may have a value between the maximum and minimum values determined by lines A—B and C—D respectively.

While we have described our invention in connection with specific examples and applications thereof, other embodiments will be readily apparent to those skilled in this art without departing from the spirit and scope thereof as defined in the appended claim.

What is claimed is:

A ferromagnetic material consisting essentially of crystals having a spinel structure and a composition corresponding to the formula:

$$Co_x[(Li^+_{0.5}.Fe^{+++}_{0.5})_y Zn_{1-y}]_{1-x}Fe_2O_4$$

in which $y$ has a value between about 0.3 and 1.0 and $x$ has a value between about $$-0.018y+0.019 \text{ and } -0.092y+0.096$$

said ferrite being made by heating a finely-divided mixture of oxides of lithium, cobalt, zinc and iron in proportions substantially corresponding to said formula at a temperature of about 900° to 1200° C. in an atmosphere containing at least as much oxygen as air, said ferrite having a coefficient of initial permeability less than about $6.3\times 10^{-6}$.

References Cited in the file of this patent

UNITED STATES PATENTS

| | | |
|---|---|---|
| 2,549,089 | Hegyi | Apr. 17, 1951 |
| 2,723,239 | Harvey | Nov. 8, 1955 |
| 2,734,034 | Crowley | Feb. 7, 1956 |
| 2,736,708 | Crowley | Feb. 28, 1956 |
| 2,751,353 | Gorter et al. | June 19, 1956 |

FOREIGN PATENTS

| | | |
|---|---|---|
| 514,217 | Canada | June 28, 1955 |
| 514,251 | Canada | June 28, 1955 |
| 1,110,819 | France | Oct. 19, 1955 |

OTHER REFERENCES

Gorter: Philips Res. Reps., vol. 9, pages 295, 299 (1954).

Weisz: Ceramic Industry, vol. 58, No. 4, pages 130, 131, 133, and 134, April 1952; vol. 58, No. 5, page 77, May 1952.